(No Model.) 5 Sheets—Sheet 2.
B. LOOMIS.
PROCESS OF AND APPARATUS FOR MANUFACTURING GAS.
No. 338,992. Patented Mar. 30, 1886.
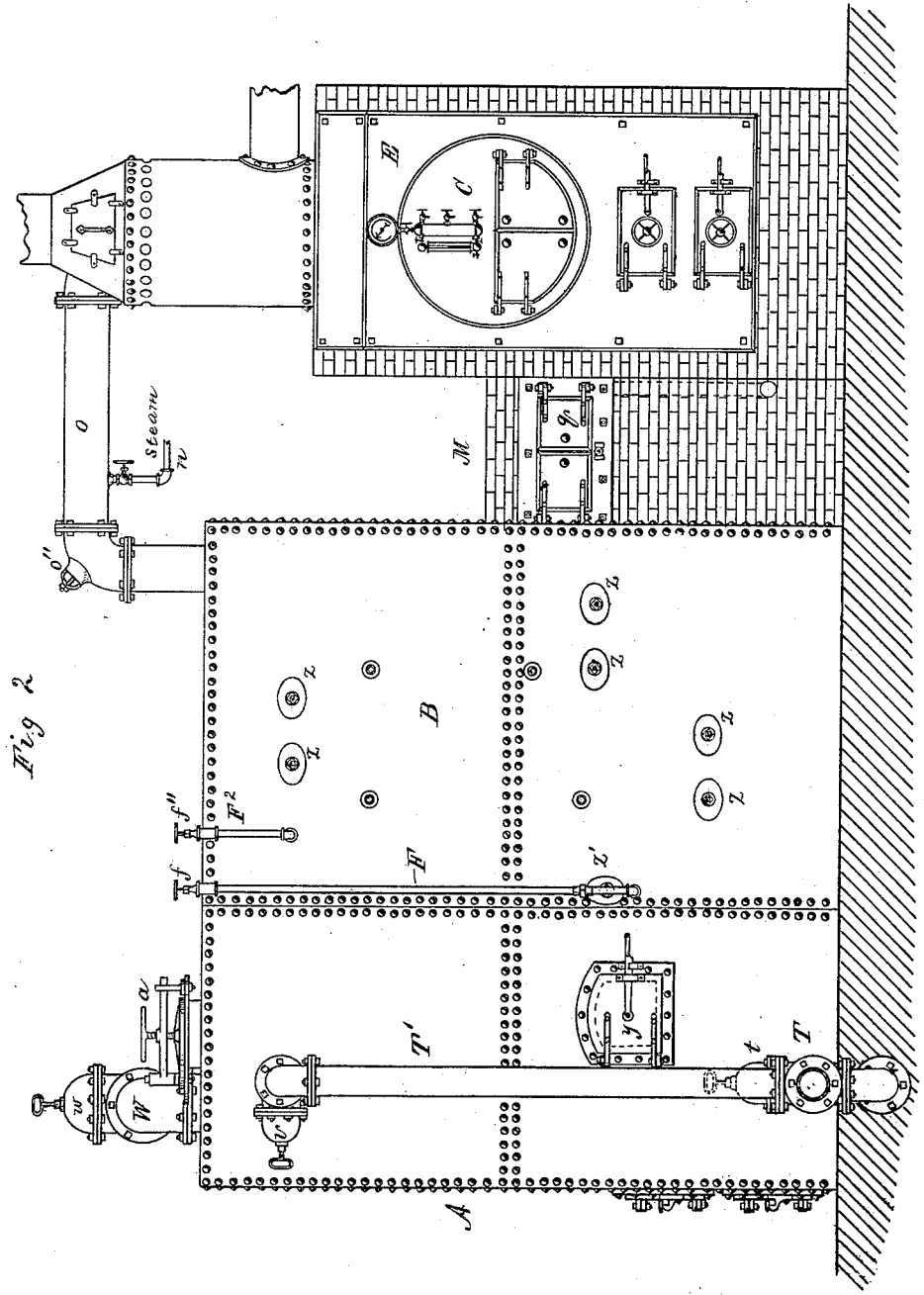
Witnesses
Albert W Roberts
Harrison Freeman
Inventor
Burdett Loomis

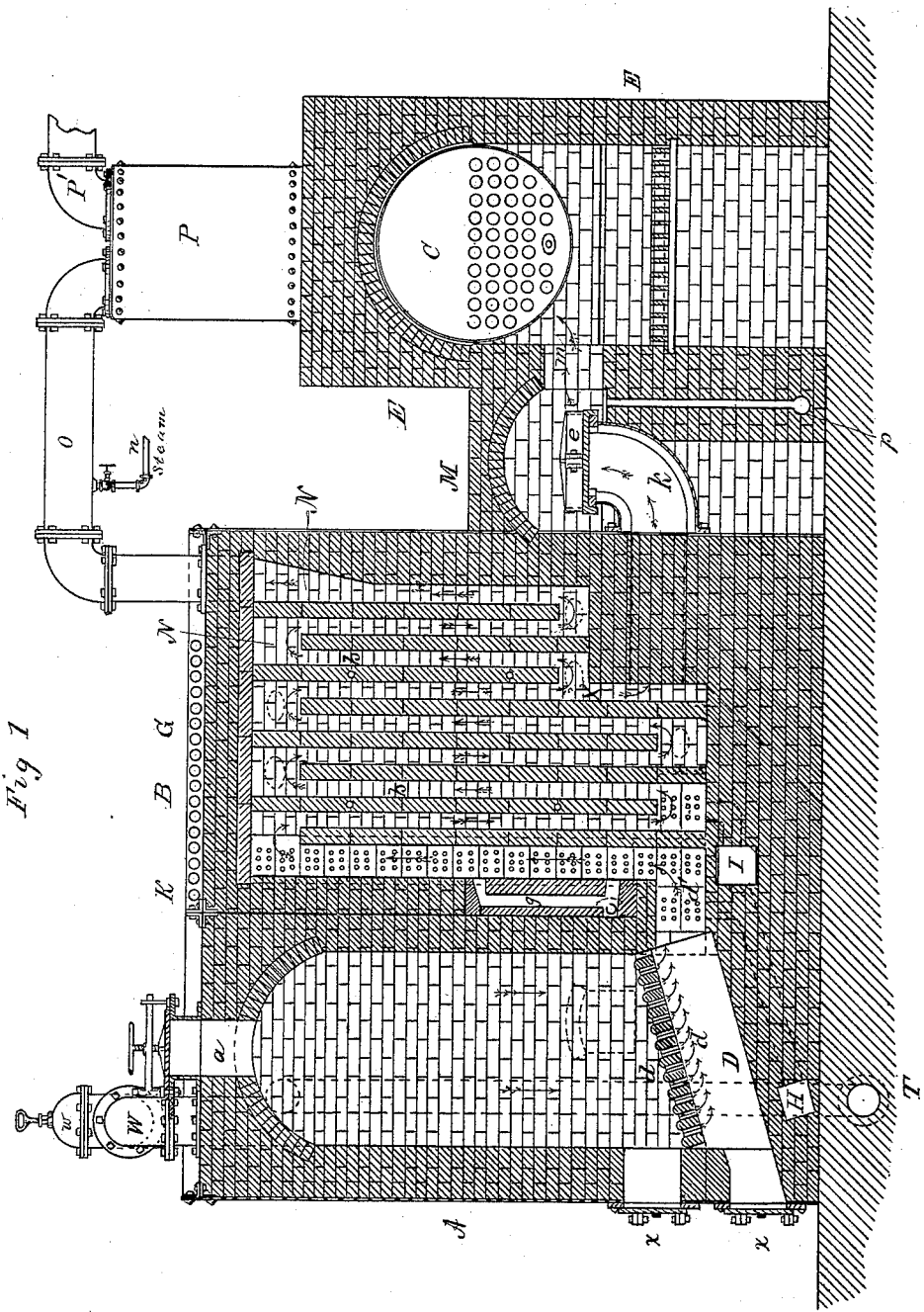

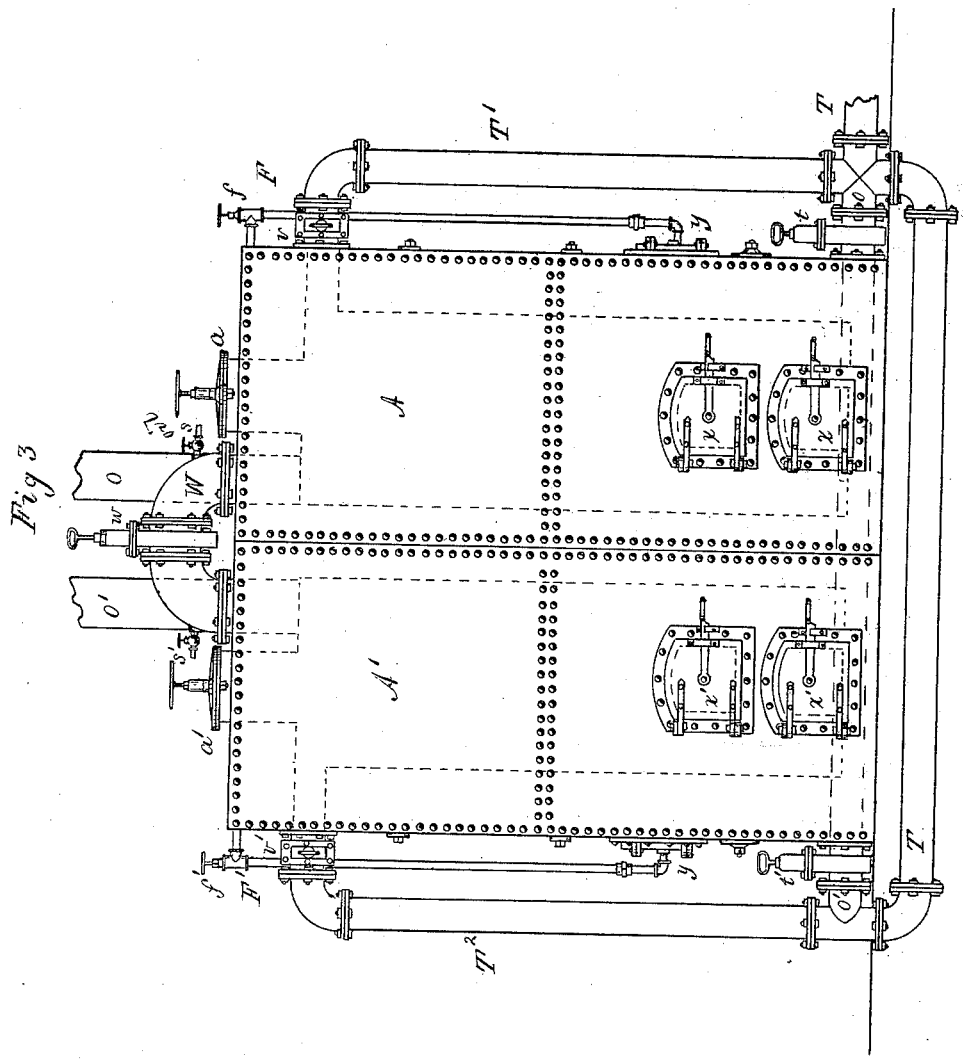

(No Model.) 5 Sheets—Sheet 4.
B. LOOMIS.
PROCESS OF AND APPARATUS FOR MANUFACTURING GAS.
No. 338,992. Patented Mar. 30, 1886.
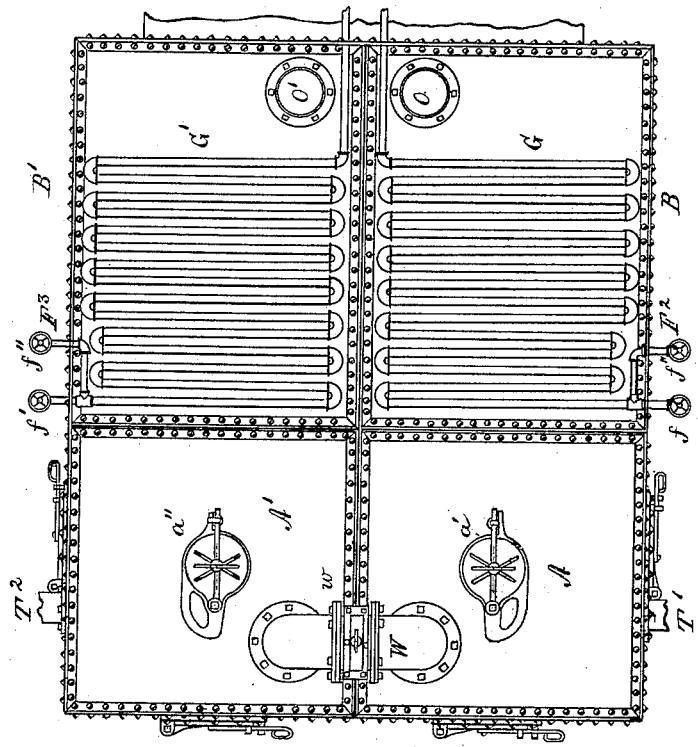
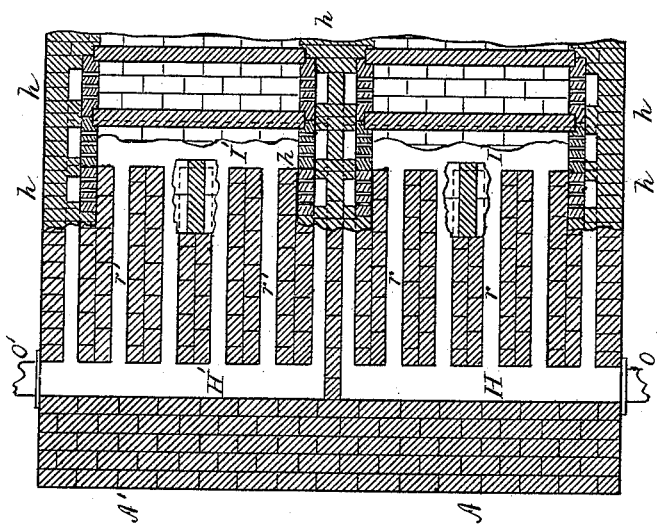

(No Model.) 5 Sheets—Sheet 5.
B. LOOMIS.
PROCESS OF AND APPARATUS FOR MANUFACTURING GAS.
No. 338,992. Patented Mar. 30, 1886.
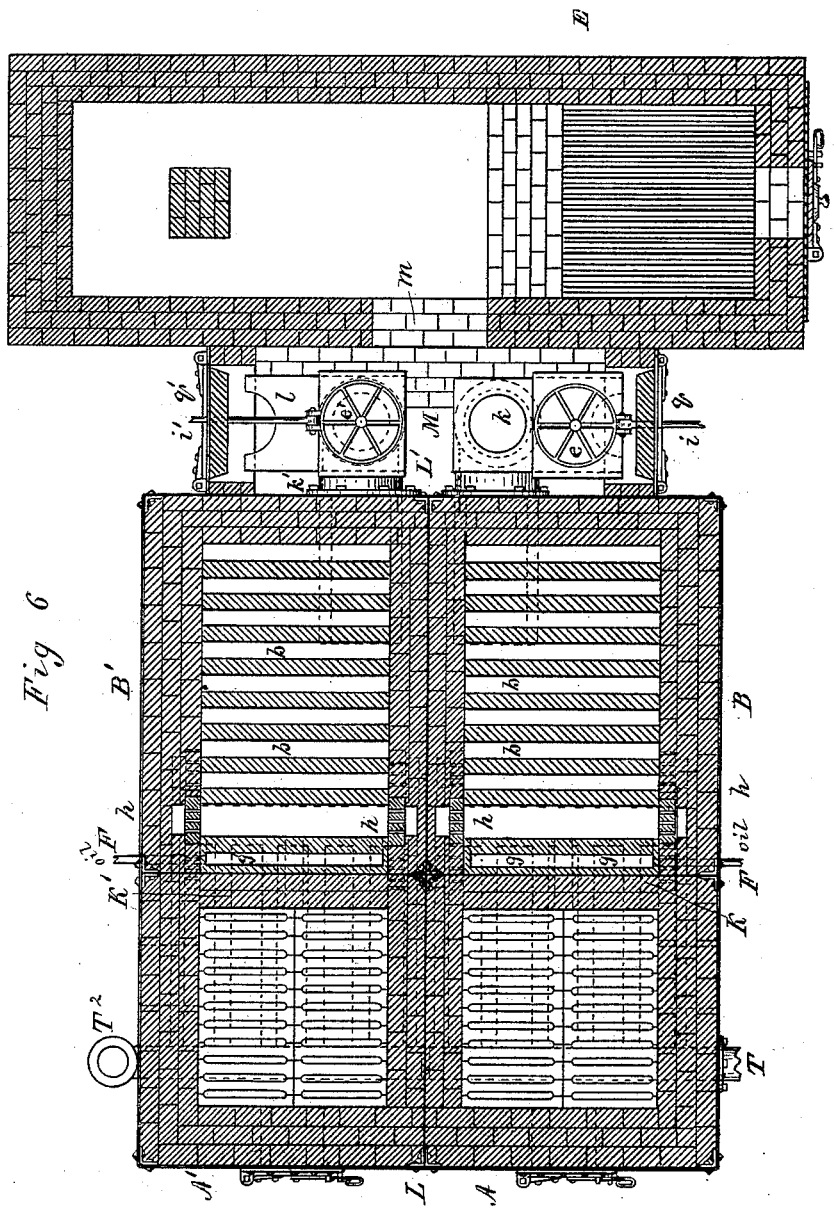
Witnesses
Albert W Roberts
Harrison Freeman
Inventor
Burdett Loomis

UNITED STATES PATENT OFFICE.

BURDETT LOOMIS, OF HARTFORD, CONNECTICUT.

PROCESS OF AND APPARATUS FOR MANUFACTURING GAS.

SPECIFICATION forming part of Letters Patent No. 338,992, dated March 30, 1886.

Application filed September 5, 1885. Serial No. 176,218. (No model.)

*To all whom it may concern:*

Be it known that I, BURDETT LOOMIS, a citizen of the United States, residing at Hartford, in the county of Hartford and State of Connecticut, have invented certain new and useful Improvements in Process of and Apparatus for Manufacturing Gas, of which the following is a specification, reference being had therein to the accompanying drawings.

This invention relates to the process of and apparatus for manufacturing heating and illuminating gas by blasting bituminous coal or other fuel downward, and heating up superheating and fixing chambers, superheating steam and decomposing it in contact with the highly heated or incandescent fuel, then carbureting the resulting gas, if desired, for illuminating purposes, and fixing it in the heated fixing-chambers.

The object of the invention is to produce a more compact, convenient, and economically-operating apparatus than those now generally in use, and particularly to better utilize the heat of the hot products of combustion and hot gas for heating air and superheating steam; also, to provide a simple and effective construction of the superheating and fixing chamber, whereby gas or steam is subjected to more uniform and prolonged heat, and such chamber can be readily cleaned of soot and ashes; also, to provide improved means for distributing hot air in the superheater for burning the gaseous products of combustion from the generator; also, to provide means for heating the hydrocarbon oil before admission to the vaporizer of the fixing-chamber.

The generator and superheater are preferably constructed double or in pairs connecting through the tops of the fuel-chambers.

A steam-boiler and furnace having a separate fire-chamber are connected with the escape-pipes for hot products of combustion from the superheating and fixing chambers.

The matter constituting my invention herein will be defined in the claims.

I will now particularly describe my invention with reference to the accompanying drawings, in which—

Figure 1 represents a vertical longitudinal section of the apparatus. Fig. 2 represents a side elevation. Fig. 3 represents a front elevation. Fig. 4 represents a top plan view of the generator and superheating and fixing chambers. Fig. 5 represents a horizontal or slightly-inclined section through the air-heating flues and furnace-walls just below the ash-pits and base of superheaters. Fig. 6 represents a horizontal section through the apparatus.

The fuel and generating chambers A A' and the superheating and fixing chambers B B' are preferably constructed in pairs and all inclosed in a single outer surrounding wall of brick covered by a tight riveted jacket of plate or boiler iron. A partition-wall, L, separates the generating-chambers, and a partition-wall, L', in line with wall L, separates the superheating and fixing chambers, and walls K K' separate the generating-chambers from the superheating and fixing chambers. These walls are of brick, with iron division-plates extending centrally through them and riveted to the outer iron jacket by means of angle-irons, thus giving strength and durability to the structure and making the walls tight. Chambers A A' are connected at the top by pipe W, having valve $w$, and they also have at the top the fuel and smoke passages $a\ a'$, provided with tightly-closing lids. An inclined grate, $d$, separates the fuel-chamber from the ash-pit D, having its bottom inclined downward and outward to correspond to the grate for facilitating the removal of clinker and ashes through doors $x\ x$. Side doors, $y$, opening into the fuel-chambers, are also provided. Air-blast pipes T' T², having valves $v\ v'$, connect with the main supply-pipe T and with the tops of chambers A A', to supply the air for a downblast. Branch pipes $o\ o'$, having valves $t\ t'$, connect blast-pipe T with transverse flues H H' below the ash-pits, as shown in Figs. 1 and 5, and longitudinal flues $r\ r'$ slightly inclined to follow the ash-pit floor, connect flues H H' with transverse flues I I'. Vertical air-distributing flues $h\ h$, arranged in the side and partition walls, and having perforated tile-faces, connect with flues I I', and distribute hot air to the hot gaseous products in the passages or throats $d'$ and in different portions of the superheating and fixing chambers B B', for causing uniform and complete combustion of such gaseous products. The flues r r' are made narrow, and are separated by brick walls, which support the floor of the ash-pit. A passage, d', connects the ash-pit of each fuel-chamber with the superheating and fixing chambers B B'. These chambers are divided by vertical fire-brick partitions b b, extending alternately from top and bottom nearly the whole vertical diameter of the chamber, so as to form flues and connecting-passages alternately at top and bottom. By this construction and arrangement a long connected passage-way or series of connected flues is uniformly heated up by hot products of combustion, the heat being stored in the brick partitions, and steam to be superheated or gas to be fixed is caused to pass more uniformly through the chamber and be longer subjected to the influence of heat than in the usual construction of heat-storing chambers; and, besides, in my construction the soot and ashes readily fall to the bottoms of the chambers, where they may be removed by the way of man or hand holes provided with covers or caps z z in the side walls. Such holes and caps are also provided in the walls at the top of the flues for the insertion of brushes or scrapers to remove soot or ashes attached to the partition-walls.

The letter N designates compartments or divisions of the superheating-chambers, at the rear ends thereof, beyond that portion which is heated by products of combustion and beyond the escape-pipes for such products. The compartment N commences at the corner X of the offset and the escape-pipes k k', one from each chamber, open just below X, and, passing through the brick-work of the offset, open into chamber M, which connects by passage m with furnace-chamber E of the steam-boiler C, just back of the bridge-wall of such furnace. Pipes k k' are curved upward into chamber M, and have horizontal top edges and flanges for the slide-valves e e', having handles i i' passing out through the walls. Supports l are provided for the valves when drawn off from the mouths of the pipes. Doors q q' are provided at each end of chamber M for giving access to the valves. An air-passage, p, is formed in the wall of chamber M for supplying air to the products of combustion as they pass into the furnace-chamber E, for burning any remaining combustible gas or particles of carbon carried by the products. Oil-vaporizing chambers g g' are formed in walls K K', and open at top and bottom into chambers B B'. Hydrocarbon oil previously heated in the coils of pipe G G' on top of the furnace is supplied by pipes F F', having valves f f', to the vaporizing-chambers. Pipes F² F³, having valves f" f''', may also supply oil to the tops of the superheating and fixing chambers, so as to drop down into the flues and meet the ascending currents of gas. A hand-hole and cap, z', is provided for cleaning the vaporizing-chamber g. The oil, in passing through coils G G', absorbs heat that would otherwise be radiated and lost, and the oil is heated to such a temperature that it immediately flashes into vapor in chambers g g' and carburets the water-gas, part of which will pass up through chambers g g' and keep them clear of carbonaceous or tarry matter. The gas-eduction pipes O O' lead from the last flue of compartment N of chambers B B' and dip into a seal-box, P, on top of the boiler-furnace, and take-off pipe P' leads to the purifiers and holder. The furnace E is provided with a grate for maintaining an auxiliary fire for heating the steam-boiler, if required, in addition to the hot products of combustion passing from the generating apparatus. Steam-supply pipes n, having valves, connect with each of the pipes O O', and an opening and cap, o", is provided in the bends of said pipes O O' for cleaning them, if required.

In practice I may connect steam-pipes with the oil-supply pipes near their connections with the furnace, to act as injectors for oil or to supply steam separately when required. Steam-pipes may also be connected directly with the ash-pits and with the tops of the generators A A', for passing steam directly into the fuel either up or down, so that steam may be decomposed by passing it down through the fuel, in which case valve w of connecting-pipe W should be closed.

Having described my improved apparatus, I will now describe the operation of making gas therein, as follows: Valves e e' in chamber M are both opened, and a fire is kindled on the grate in each chamber A A', air being supplied by a downdraft, for which purpose valves v v' of the blast-pipe T' T² are opened, admitting blasts of air to the tops of chambers A A', and valves t t' are also opened, admitting air to the flues below the ash-pits. The air passes down through the fuel, causing active combustion and producing high heat, and thereby coking the charges of bituminous coal which are cast on top of the heated fuel. The resulting hot gaseous products containing carbonic-oxide and other combustible gas from the coal pass into the ash-pit, heating the air-flues below, and thence through passage d' into chambers B B', where they meet the currents of hot air from vertical flues h at different points in two or more of the flues between partitions b, resulting in their complete combustion and the generation of high heat, which is imparted to the brick-work forming the flues. The hot products of combustion finally pass from chambers B B', through pipes k k', into chamber M, and thence into furnace E, under the steam-boiler, for generating steam. The blasts are continued till deep beds of incandescent fuel are formed in chambers A A' and chambers B B' are heated to the required temperature. Then all the air-valves are closed. Valves e e' are closed, and steam is admitted into one of the superheating-chambers, as chamber B, through pipes n and O, and is highly superheated by passage through the heated flues thereof, and is then passed up through the incandescent fuel in chamber A, where it is decomposed, resulting in the formation of hydrogen, carbonic oxide, and a small per cent. of carbonic acid. These gases pass through pipe W, the valve $w$ of which is open, into chamber A' and down through the bed of fuel therein, carrying with them the carbureted-hydrogen gases distilled from the coal, which add to the illuminating-power of the gas, and in this second bed of fuel the carbonic acid is completely converted into carbonic oxide. All tarry matter or vapors distilled from the upper layers of coal are converted into fixed gas or deposited while passing down through the bed of incandescent fuel below. The water-gas and coal-gas pass into chamber B', where they are carburetted to the desired candle power by hydrocarbon vapor generated in chamber $g'$, oil being supplied by pipe F'. The carbureted gas is then fixed by passage through fixing-chamber B'. The hot gas, in passing through compartment N or heat-restorer of chamber B', heats the brickwork forming the flues thereof, and passes thence to the hydraulic box P, from which it goes to the scrubber or condenser and purifiers. The manufacture of gas is thus continued till the fuel is reduced below the proper decomposing temperature and the superheating and fixing chambers are cooled down. The steam and oil are then shut off and the apparatus is heated up, as above described, except that chamber B', through which the gas was last passed, need not be specially heated, as it is left hot by hot gas. The fuel in chamber A' is also left comparatively hot, since the steam was passed directly into chamber A, which would be first cooled, and only hot gas was passed into chamber A', which would be little cooled. The blast is therefore applied, principally or wholly, to fuel-chamber A and fixing-chamber B. The apparatus having been suitably reheated, the blast is shut off, and steam is now admitted first into heat-restorer N of chamber B', which was previously heated by the outgoing hot gas, and is passed on through chamber B', where it is superheated. It is decomposed in chambers A' and A, and is carbureted and fixed in chamber B, and in passing out heats compartment N beyond the point where products of combustion have been passed, as such products were passed out below X through pipe $k$. Steam passed through the chamber through which gas was last passed cleans it of carbonaceous matter which may have been deposited therein. As above indicated, fresh bituminous coal, either in quantity in lumps or ground or in form of dust, may be charged by means of self-feeders onto the beds of incandescent fuel when ready to make gas, and the superheated steam or gases resulting from its decomposition, in passing up through the fresh coal, will carry off its hydrocarbons, forming a gas of several candle power, and less oil will thus be required for carbureting the gas. I may also admit crude oils or tar or liquid asphaltum by pipes $s\ s'$, connecting with pipe W, into the hot gases as they are passing over from one chamber to the other or into the ash-pits, whereby such oils, tar, or asphaltum would be rapidly vaporized and converted into fixed gas by passage down or up through the bed of fuel. Of course the gas could be further enriched by oil admitted into the fixing-chamber. A superior quality of heating-gas is made by the above operation, omitting the hydrocarbon-oil supply in the fixing-chamber.

I can make in this apparatus what is called "generator-gas," but with greater economy than in other generators, since waste heat is by my process and apparatus used in heating the air and steam. For making a cheap heating-gas, air and steam are both passed into the rear of one of the superheating and fixing chambers, and thence into the fuel, and the resulting gas is passed out through the other superheating-chamber. When the steam and air heater becomes cool, the direction of the current is reversed, the air and steam now being passed into the chamber through which the hot gas was last passed, and thus be heated by the waste heat.

The operation of making this quality of gas by the use of air and steam is practically continuous, as a sufficient proportion of air is used to support combustion of the fuel and keep it at a proper temperature for decomposing steam.

In regard to the apparatus, I wish it understood that the fire-clay partitions in the superheating and fixing chambers may be arranged longitudinally or lengthwise, or they may be arranged horizontally, as found most convenient or desirable.

Having described my invention, what I claim, and desire to secure by Letters Patent, is—

1. The process of manufacturing heating-gas which consists in heating two bodies of fuel by downward blasts of air, heating two superheating and fixing chambers by burning the resulting gaseous products, then superheating steam by passing it through one of the superheating-chambers, decomposing it by passing it through one body of heated fuel, then passing the resulting gases through the other body of heated fuel, for converting the carbonic acid into carbonic oxide.

2. The process of manufacturing gas which consists in heating two bodies of fuel by downward blasts of air, heating two superheating and fixing chambers by burning the resulting gaseous products, then superheating steam by passing it through one of the superheating-chambers, decomposing it by passing it through one body of heated fuel, then passing the resulting gases through the other body of heated fuel for converting the carbonic acid into carbonic oxide, then carbureting the water-gas and fixing it by passing it through the heated fixing-chamber.

3. The process of generating gas which consists in passing superheated steam up through a body of incandescent fuel for decomposing it, then admitting crude oil, tar, or liquid asphaltum into the resulting hot gas and passing it down through a second body of heated fuel for converting such oil, tar, or asphaltum into gas, then carbureting the gas, if required, and fixing it by passing it through the heated fixing-chamber.

4. The two generating-chambers connected at the top, in combination with the two superheating and fixing chambers connecting with the bases of the generating-chambers, as and for the purpose described.

5. In combination with the fuel and generating chamber of a gas apparatus having an air-blast pipe connecting with its top, the connected air-flues below the ash-pit for heating the air, as described.

6. In combination with the generating-chamber of a gas apparatus having an outlet-passage for gases leading from the ash-pit, the system of air-heating flues arranged below the ash-pit, and the connecting blast-pipe, substantially as described.

7. In combination with the superheating and fixing chamber, the air-flues arranged in its walls and opening into different portions of such chamber by suitable perforations, for causing a better distribution of air and causing more uniform and complete combustion of gaseous products for heating such chamber.

8. The combination of the generating-chamber, the superheating and fixing chamber, the air-heating flues arranged below the ash-pit, and the connected perforated flues opening into different portions of the superheating and fixing chamber.

9. In combination with the superheating and fixing chamber having flues and partitions, as described, the elongated oil-vaporizing chamber located in the wall near the gas-inlet to the superheating-chamber, and opening at both ends into such chamber, for the purpose described.

10. The combination of the oil-vaporizing chamber, the superheating and fixing chamber, and the oil-heating coil placed on top of the superheating and fixing chamber.

11. The superheating and fixing chamber having a compartment heated by the combustion of gaseous products, and an escape-pipe for products of combustion leading therefrom, and a second compartment heated by the fixed gas, and gas-eduction pipe leading therefrom, for the purpose described.

12. The combination of the superheating and fixing chamber, valve-chamber M, pipe $k$, leading from the former to the latter, a slide-valve in chamber M for closing the pipe, and the connected steam-boiler furnace.

13. The combination of two generating-chambers, two superheating and fixing chambers, a chamber, M, two pipes for products of combustion, opening into chamber M and having valves, and the connected steam-boiler furnace, for the purpose described.

14. In combination with pipe $k$, conducting gaseous products from the superheating and fixing chamber, the air-supply pipe $p$, opening near pipe $k$, and the connected steam-boiler furnace, for the purpose described.

In testimony whereof I affix my signature in presence of two witnesses.

BURDETT LOOMIS.

Witnesses:
HARRISON B. FREEMAN,
LEWIS SPERRY.